US011015401B2

(12) United States Patent
Gordon et al.

(10) Patent No.: US 11,015,401 B2
(45) Date of Patent: May 25, 2021

(54) DOWNHOLE FRICTION REDUCTION TOOLS

(71) Applicant: Stinger Oil Tools, LLC, Houston, TX (US)

(72) Inventors: Danny L. Gordon, Sugar Land, TX (US); Zachary Driver, Houston, TX (US); Roy Jones, Cypress, TX (US)

(73) Assignee: STINGER OIL TOOLS LLC, Houston, TX (US)

( * ) Notice: Subject to any disclaimer, the term of this patent is extended or adjusted under 35 U.S.C. 154(b) by 0 days.

(21) Appl. No.: 16/688,180

(22) Filed: Nov. 19, 2019

(65) Prior Publication Data
US 2021/0032942 A1    Feb. 4, 2021

Related U.S. Application Data

(60) Provisional application No. 62/880,300, filed on Jul. 30, 2019.

(51) Int. Cl.
*E21B 17/10*   (2006.01)
*F16C 29/04*   (2006.01)

(52) U.S. Cl.
CPC ........ *E21B 17/1057* (2013.01); *F16C 29/046* (2013.01)

(58) Field of Classification Search
CPC .. E21B 17/1057; B65G 39/025; F16C 29/046
See application file for complete search history.

(56) References Cited

U.S. PATENT DOCUMENTS

| 5,522,467 | A | 6/1996 | Stevens et al. |
| 5,715,898 | A | 2/1998 | Anderson |
| 6,250,394 | B1* | 6/2001 | Mashburn ........... E21B 17/1057 166/241.3 |
| 2002/0020526 | A1* | 2/2002 | Male ................... E21B 17/1057 166/241.6 |
| 2006/0016664 | A1 | 1/2006 | Pallini et al. |
| 2015/0361731 | A1 | 12/2015 | Wood et al. |
| 2016/0362944 | A1* | 12/2016 | Harvey ............... E21B 17/1071 |

FOREIGN PATENT DOCUMENTS

| CN | 202718638 U | 2/2013 |
| CN | 209244527 U * | 8/2019 |

* cited by examiner

*Primary Examiner* — Giovanna Wright
(74) *Attorney, Agent, or Firm* — D'Ambrosio & Menon, PLLC; Usha Menon

(57) ABSTRACT

The downhole friction reducing tool of the present invention includes an integral friction coefficient reducer and is configured to reduce friction in all planes, reduce torque and/or drag continually and reduce frictional wear and damage that can result in loss of integrity to surface areas where it travels. The friction coefficient reducer involves a ball transfer unit having a plurality of roller ball units. The roller ball units include a large-diameter load-bearing roller ball unit and a plurality of smaller-diameter supporting roller ball units.

15 Claims, 8 Drawing Sheets

DOWNHOLE FRICTION REDUCTION TOOLS

CROSS-REFERENCE TO RELATED APPLICATION

The present application claims the benefit of the earlier filing date of provisional application Ser. No. 62/880,300 filed on Jul. 30, 2019, entitled "Downhole Friction Reduction Tools," the content of which is hereby incorporated by reference in its entirety.

BACKGROUND OF THE INVENTION

1. Field of the Invention

The present invention pertains to downhole tools having integral friction reducing elements. More particularly, the present invention pertains to downhole tools having at least one friction reducing element on at least one interior and/or exterior surface to reduce frictional forces acting on the tool, assist the centripetal and tangential forces, and/or friction in all planes on the tools.

2. Brief Description of the Prior Art

During operations in the oil and gas industry, a pipe or substantially tubular tool having a certain outer diameter is frequently inserted or otherwise received within a wellbore or pipe having a larger inner diameter. Such operations are often performed during drilling, completion, intervention, and production phases of a well's life cycle. By way of illustration, but not limitation, drill pipe, casing and other tubular goods are routinely run into cased and uncased wellbores. Similarly, tools and other downhole assemblies are often conveyed in and out of wells via jointed pipe, continuous (spooled) tubing and/or wireline.

In such cases, frictional forces—typically so-called "sliding friction" and "rotational friction"—from surrounding surfaces acting on such inner pipe or tool(s) can impede such inner pipe or tool(s) from advancing further into and/or rotate in a well. In order to reduce or lessen such forces, friction reducing elements on a tool/tools can be utilized. In most cases, such friction coefficient reducers are installed on at least one exterior surface that is being conveyed into a well.

Various types of friction-reducing devices including, without limitation, so-called "roller subs" and/or "swivels", are currently used throughout the oil and gas industry in an effort to reduce or limit such sliding friction and/or rotational friction. Conventional roller subs typically comprise substantially cylindrical body members having radial slots at predetermined intervals. Rollers and/or wheels are rotatably disposed within said slots. In many cases, such roller subs are modular in construction; as such, the roller subs can be assembled in a manner to secure the rollers and/or roller wheels in place, avoiding the need for grub screws and facilitating relatively compact dimensions. Swivels are cylindrical body member having two or more independent body members coupled to enable one member to revolve without revolving the other member(s).

Although such devices as "roller subs" can be used in many different applications, use of roller subs is especially prevalent during downhole wireline operations. Such wireline operations generally rely on gravity alone in order to advance a toolstring in a well. As such, roller subs can be especially useful in directional wellbores that deviate substantially from vertical. Roller subs help to reduce sliding friction, thereby allowing wireline tools to advance deeper within a well.

One type of conventional stabilizer rolling sub assembly comprises rollers mounted on multiple axles, which are each parallel to a longitudinal axis of a stabilizer body (and, hence, also parallel to the longitudinal axis of a drillstring and of a well drilled thereby). The functional effect associated with this form of stabilizer is to reduce rotational friction, while having a neutral or even adverse effect on longitudinal sliding frictional forces.

Although devices, such as swivels, can be used in many different applications, use of swivels is especially prevalent during downhole wireline operations, sucker rod lifting, continuous piping, and jointed piping operations. Such operations generally rely on swivels to reduce torque of the equipment or tools being deployed or retrieved. In several cases, torque has prevented movement of components, and has even damaged components.

Current devices do not work well in all planes due to design limitations or other constraints during normal operations. Some of the constraints are, but not limited to, torque, drag, friction, rotation, slide, twist, bend, and gravity force reduction due to friction and other forces. Many standard devices, tools, toolstrings, wireline and/or coiled tubing have difficulties with friction, axial forces, and negative effects of side-loading forces while attempting to reach or be retrieved from a trajectory that is difficult to reach by standard means. Thus, there is a need for a device which can reduce rolling friction, assist the centripetal and tangential forces, and/or friction in all planes.

SUMMARY OF THE INVENTION

According to an embodiment, a friction reducing tool for use in a wellbore is provided. The friction reducing tool includes a housing or a body member and one or more friction coefficient reducers integrated/assembled on the body member. Each friction coefficient reducer includes a ball transfer unit comprising a plurality of spherical roller ball units. The roller ball units include a load-bearing roller ball unit and an uninterrupted array of supporting roller ball units. The load-bearing roller ball unit has a substantially larger diameter than the supporting roller ball units. Each supporting roller ball unit configured to abut at least a side of the load-bearing roller ball unit.

The body member can have any desired profile. In one or more embodiments, the body member is cylindrical.

The friction coefficient reducers are configured to substantially reduce frictional and axial forces and negative effects of side-load forces. The friction coefficient reducers are further configured to reduce friction in multiple planes and to reduce torque and/or drag.

The supporting roller ball units are configured in a single and contiguous layer. The supporting roller ball units are configured for omni-directional movement. The supporting roller ball units are configured to share an external force applied to the body member and/or the load-bearing roller ball unit.

The supporting roller ball units are disposed in a cavity bounded by a concave surface of the body member, a convex surface of the load-bearing roller ball unit and a bottom surface of a ball restraint. The ball restraint can be selected from a group consisting of, but not limited to, a cap, a ring and a washer or combinations thereof. The ball restraint is configured to securely hold the supporting roller ball units within the cavity. The ball restraint is further configured to restrain the load-bearing roller ball unit and to ensure that it is in constant contact with each of the supporting roller ball units.

The ball restraint is further held in position by a ball retainer. The ball retainer consists of any means that retains the ball restraint, can withstand the loads applied and is not adversely affected by the environment of its application. Examples of a ball retain can include, without limitation, a clip, thread, cap, circular clip, snap ring, spiral ring, pin, a weld, an elastomer, an adhesive or combinations thereof.

In one or more embodiments, the friction reducing tool can be selected, without limitation, from a group consisting of a roller coiled tubing connector, a roller tubing sub assembly, a roller stick pipe connector, a roller sucker rod coupling, a roller wireline stem assembly and a roller valve rod guide. According to an embodiment, the friction reducing tool can be connected to a downhole tool or equipment and disposed in a wellbore.

The body member can include at least one connector. The connector can be located at a first and/or a second end of the body member. The connector can be selected from a group consisting of a thread, a slip prevention device, a weld, a pin, a quick lock, a clip, screws, an anchor, a ratchet, a cast, a collet, adhesive and/or combinations thereof.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the following description.

BRIEF DESCRIPTION OF THE FIGURES

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. Embodiments shown in FIGS. 2-6 contain one or more friction coefficient reducers in accordance to the current disclosure. In the drawings.

DETAILED DESCRIPTION

The one or more embodiments of the invention include a friction reducing tool for use in a wellbore. The friction reducing tool can include a body member. The body member can have a solid core or an inner bore. In certain embodiments, the body member can be cylindrical.

The friction reducing tool is configured with one or more integral friction coefficient reducers. The friction reducing tool can include a connector. The connector can include, without limitations, threads, a slip prevention device, a weld, a pin, a quick lock, a clip, an anchor, a ratchet, a cast, a collet, adhesive or combinations thereof. The connectors can be provided at one end or both ends of the body member. The friction reducing tool can be configured to provide a "lift" from one side in a tubular or wellbore to reduce the friction and eliminate dragging debris, which can minimize movement, cause tools or equipment to become stuck, or cause damage to the said tubular or wellbore.

The friction reduction tool can be manufactured from any material. For example, the material can be selected from stainless steel, Inconel alloys, polymer, and other suitable materials to accommodate the necessary strength, various wellbore fluids, and elevated temperatures. The friction reduction tool is configured to be successfully used in deviated wells, high dogleg severity wells, or otherwise problematic wells while performing production, completion, intervention, or drilling operations.

The friction coefficient reducers can be integrated into/assembled into a machined groove formed on the body member. In an embodiment, the friction reducing elements can be integrally 3D printed simultaneously with the sub, support ball units, load ball units, connectors and caps using methods such as Direct Metal Laser Sintering (DMLS). The friction coefficient reducers can be configured to reduce friction, axial forces, and negative effects of side-load forces. The friction coefficient reducers can reduce friction in all planes—vertical, horizontal and diagonal—reduce torque and/or drag continually and reduce frictional wear and damage that can result in loss of integrity to surface areas where the tool travels. This facilitates more maneuverability of downhole tools that are deployed or retrieved.

Figure 1:
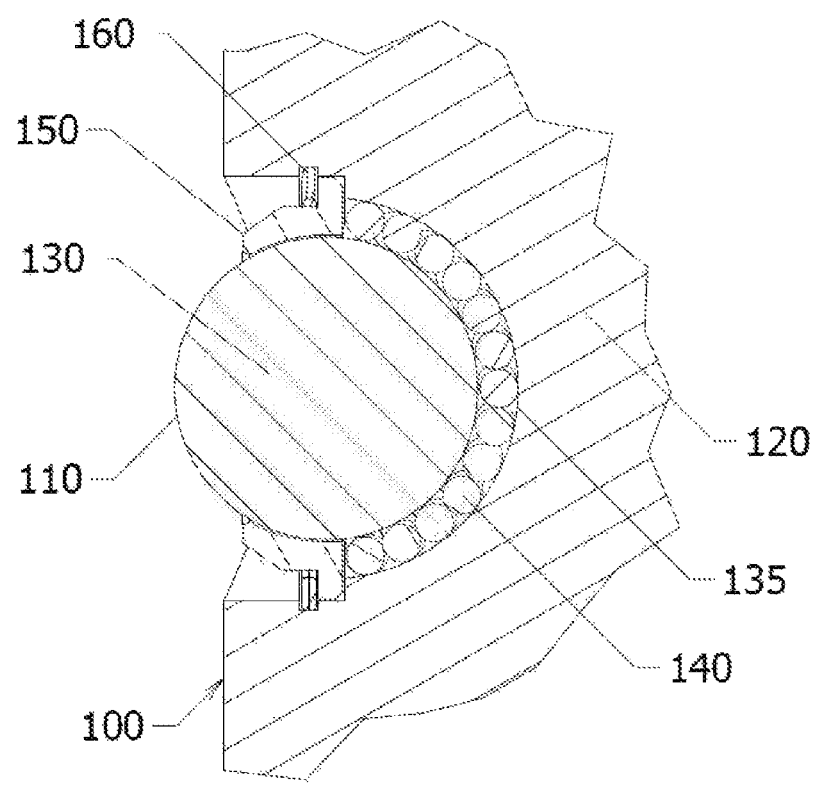
FIG. 1 illustrates a friction coefficient reducer according to an embodiment.

Now referring to FIG. 1, an embodiment of a friction reducing tool 100 is illustrated. The friction reducing tool 100 includes a friction coefficient reducer 110. Conventionally, a method of getting a tool string downhole includes placing a vibrator on the string. However, vibrators can be abusive and destructive to downhole equipment. In contrast, the use of the friction coefficient reducer of the present invention is not destructive to downhole tools and equipment. The friction coefficient reducer also eliminates or substantially reduces the need for expensive chemicals such as friction reducers, oil-based mud, and/or other lubricants which can be incompatible with a downhole formation.

The friction coefficient reducer 110 includes a plurality of spherical roller ball units. The roller ball units can be made of stainless steel, ceramic, Inconel alloys, polymers and other materials in a variety of patterns. Patterns may vary based on the tool geometry, obstructions on the tool, or to create the desired effect for a particular application. The friction coefficient reducers can be placed in groups, in planar configurations, in longitudinal lines, in arrays, helical patterns or any other pattern that creates the desired beneficial effect of reducing friction or creating stand-off for the tool and/or tool string that they are incorporated into. The roller ball units can be assembled into grooves or holes bored into a housing/mandrel/surface of the body member 120 of the friction reducing tool. In certain embodiments, the roller ball units can be inserted or pressed into grooves bored into the surface of the body member.

The friction coefficient reducer includes a larger-diameter load-bearing roller ball unit 130. The load-bearing roller ball unit 130 is configured to support the forces due to contact with the well bore or the internal tubular wall, reduce friction and allow maneuverability and/or motion of the body member. An uninterrupted array of smaller-diameter roller ball units 140 support and carry the load from the load-bearing roller ball unit 130.

The supporting roller ball units 140 have a smaller contact area than the load-bearing roller ball unit 130. These supporting roller ball units 140 and the load-bearing roller ball unit 130 can have many different size configurations. The supporting roller ball units 140 share the force(s) that are applied to the body member and/or the load-bearing roller ball unit 130. The supporting balls 140 distribute the load to the housing 120 over a larger surface area than that of the load-bearing roller ball unit 130 so the stress in the housing 120 is thereby reduced. For this reason, the friction coefficient reducer 110 can increase the load carrying capability of the tool it is assembled into. Each supporting roller ball unit 140 is configured to abut or wrap around a side of the load-bearing roller ball unit 130. This ensures that the supporting roller ball units 140 can provide support not only in the direction normal to external surface of the body member 120 but also when the load is applied to the roller ball unit 130 approximately parallel to the direction of travel of the friction reducing tool 100. This angled load is also similar to that seen by the friction reducing tool as it encounters an obstruction when a tool string is run downhole.

The supporting roller ball units 140 are configured for omni-directional movement. The supporting roller ball units 140 are configured in a single and continuous layer that completely fill a cavity or opening 135 formed by the concave surface of the housing/body member 120, a lower convex surface of the load bearing roller ball unit 130 and a bottom surface of a ball restraint 150. Each of the supporting roller ball unit 140 is always configured to be in constant contact with the load-bearing ball unit 130. Since the load bearing ball unit 130 is always in constant and direct contact with the supporting roller ball units 140, any rotational movement of the load-bearing ball unit 130 is directly translated into movement of all the supporting roller ball units 140 in the cavity 135. Because the load-bearing ball unit 130 is in rolling contact with the convex wall of the body member 120 through the supporting roller ball units 140 and not in sliding contact with the convex wall of the body member 120, the frictional forces are drastically reduced. The load-bearing roller ball unit 130 applies the load to the supporting roller ball units 140 which in turn apply the distributed load to the semi-spherical surface of the body member 120 that abuts the supporting roller ball units 140. Advantageously, there is no involvement of fluid pressure, or pressure regulation in the present invention in order to support the load-bearing unit 130 or to reduce rolling friction of the same.

The roller ball units are configured to protrude from an inner surface and/or an outer surface of the body member 120. This allows the load-bearing roller ball unit 130 to rotate and maneuver on the supporting roller ball units 140, thus reducing friction on the tool. The friction coefficient reducer 110 can be configured to reduce sliding friction and to allow it to maneuver through obstructions with reduced wear to components it contacts, such as, components commonly found in cylindrical pipe, casing, or uncased wells. Thus, the friction coefficient reducer 110 assists in the delivery of downhole tools, tubing, and pipe strings within a well, pipeline, or other components.

The friction coefficient reducers 110 can be oriented in a plurality of planes, in arrays, or they can be oriented equidistant or non-equidistant to each other. For example, they can be oriented in a concentric or eccentric plane. The friction coefficient reducers can be arranged such that at least one of the roller ball units is always in contact with a wall of at least one of a pipe, tubing, casing, a wellbore, or another open hole area in a well that the friction reducing tool is placed in. The roller ball units can be configured to roll over or around hard and soft debris inside the wellbore. The friction coefficient reducer allows rotation in a horizontal or diagonal plane to reduce torque which conventional roller wheel systems cannot achieve since the roller wheel has a single axis. If motion is parallel to the axis of rotation, a roller wheel increases friction by dragging instead of rolling. The friction coefficient reducer also allows 360° rotation to reduce drag and torque in all planes—vertical, diagonal and horizontal—and help products, equipment, or tools maintain crucial momentum during movement. It can reduce wear and damage that can result in loss of integrity and allows for more maneuverability of tools being deployed or retrieved from a wellbore.

The load-bearing roller ball unit 130 and the supporting roller ball units 140 can be retained in their original position by means of a ball restraint 150. The ball restraint 150 can include one or more restrainer, such as, a cap, a ring, a washer. The ball restraint 150 is configured to keep all the supporting roller ball units 140 in the cavity 135. The ball restraint 150 further restrains the load-bearing ball unit 130 and ensures that it is in beneficial contact with the supporting roller ball units 140. The ball restraint 150 can be configured to have a pronounced profile in order to add more or less projection to the roller ball units. The ball restraint 150 is contoured to allow the load-bearing roller ball unit 130 to rotate.

The ball restraint 150 can be held in position by means of a ball retainer 160. The ball retainer 160 is configured as the locking mechanism for the friction coefficient reducer. The ball retainer 160 can include, without limitations, one or more retainer means, such as, a clip, circular clip (circlip), snap ring, spiral ring, thread, pin, a weld, elastomer, adhesive, or other restraining items, and combinations thereof for retention of the ball restraint 150 in the body member. Advantageously, unlike conventional friction reducing tools, the ball restraint 150 does not involve the use of threads to retain it in position. Space is thereby conserved which is important in some applications of the current invention.

The embodiments of the friction coefficient reducer of the present invention involve very few components that would need secondary retention in contrast to conventional friction reducing tools. As such, the risk of any component becoming lose and falling into the wellbore is also minimized. It is important to note that in most oilfield applications, any object that is dropped in the wellbore can damage sensitive equipment below.

Sometimes, the use of a large inner diameter production tubing becomes necessary to optimize the flow rates from the wellbore. In such instances, it is important for the size of the friction reducing tool to avoid being a constraint to such use. In comparison to conventional friction reducing tools, the friction reducing tool of the present invention facilitates better space conservation or utilization of a given annulus. Additionally, production tubing is relatively thin. The integral frictional reducing assemblies of the present invention are configured to work well in such tubing without the need for additional wall thickness.

The body 120 of the friction reducing tool is configured as a resting or a load bearing surface for the one or more friction coefficient reducers. Accordingly, the friction coefficient reducers of the present invention do not require any separate supporting or seating element. In conventional friction reducing tools that require a seating element, there is a risk that the application of repetitive extreme loads could cause the seating element to back out, weaken, or become unthreaded from the tool.

The friction coefficient reducer can be conveniently repaired in-situ by removing, pulling out or drilling out the retaining mechanism, observing any worn roller ball units, and then inserting new ones as replacements.

FIGS. 2-6 illustrate different embodiments of a downhole friction reducing tool comprising one or more integral friction coefficient reducers 110, as previously described with reference to FIG. 1.

Figure 2:
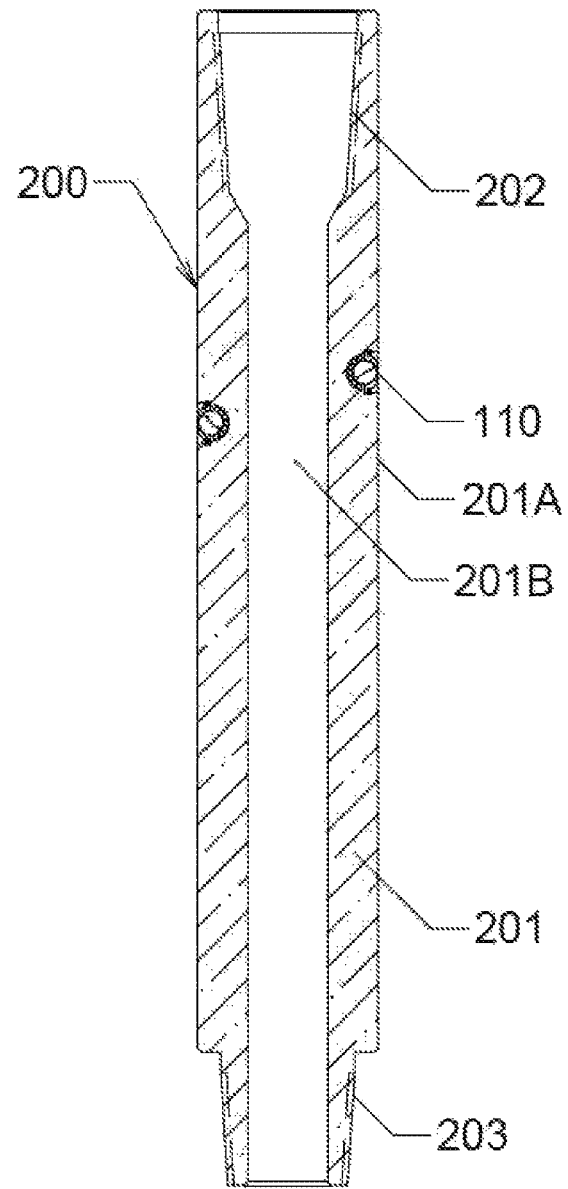
FIG. 2 illustrates a side sectional view of a roller coiled tubing connector.

In an embodiment, as illustrated in FIG. 2, a friction reducing tool 200 comprises a roller coiled tubing connector. The friction reducing tool 200 includes a cylindrical housing or body member 201 having a central bore and upper and lower connectors 202 and 203. The connectors 202 and 203, which can be male and/or female, are configured for attachment to downhole equipment or tubing by one or more means, such as a, thread, weld, quick lock, cast, screw, pin and/or an O-ring seal. The cylindrical body member 201 includes an outer surface 201A and an internal surface 201B. The friction reducing tool 200 includes one or more integral friction coefficient reducers 110. The friction coefficient reducer 110 can be molded onto or machined into the cylindrical body member 201 during the manufacture of the friction reducing tool 200. A pre-determined number of friction coefficient reducers 110 can be machined into the cylindrical body member 201. The friction coefficient reducers 110 can be arranged at pre-determined intervals along the length of the cylindrical body member 201.

Figure 3:
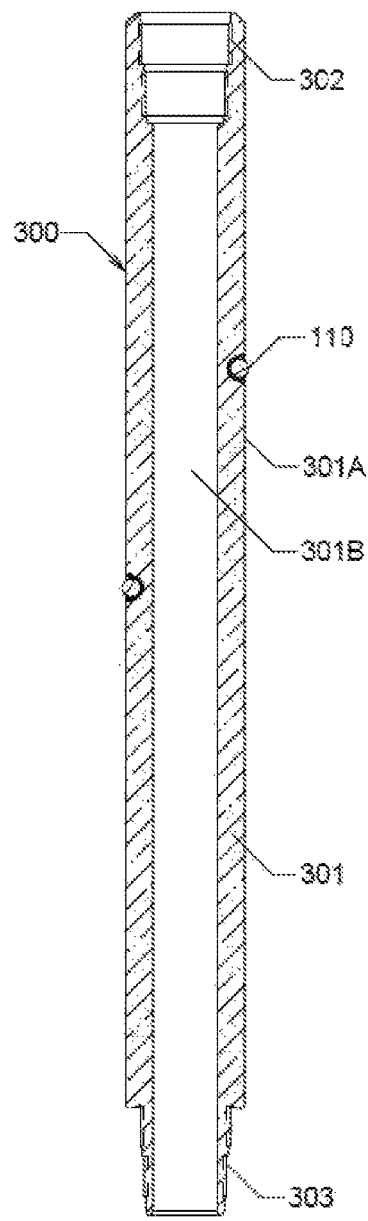
FIG. 3 illustrates a side sectional view of a roller stick pipe connector.

In another embodiment, as illustrated in FIG. 3, a friction reducing tool 300 comprises a roller tubing sub assembly or a roller tubing stick pipe connector. The roller tubing sub assembly can be configured to provide a lift off the wall of another pipe or wellbore to allow clearance between the friction reducing tool 300 and the annular space of the pipe or wellbore. It can take the form of a tubing sub of various inner and outer diameters and lengths. It can also take the form of a mule shoe of various inner and outer diameters and lengths. The mule shoe can also help protect the top of a liner, which is a smaller outer diameter pipe that is connected to a larger pipe. The friction reducing tool 300 includes a cylindrical housing or body member 301 having a central bore and upper and lower connectors 302 and 303. The connectors 302 and 303, which can be male and/or female, are configured for attachment to downhole equipment or tubing by one or more means, such as a, thread, weld, quick lock, cast, screw, pin and/or an O-ring seal. The cylindrical body member 301 includes an outer surface 301A and an internal surface 301B. The friction reducing tool 300 includes one or more integral friction coefficient reducers 110. The friction coefficient reducer 110 can be molded onto or machined into the cylindrical body member 301 during the manufacture of the friction reducing tool 300. A pre-determined number of friction coefficient reducers 110 can be machined into the cylindrical body member 301. The friction coefficient reducers 110 can be arranged at pre-determined intervals along the length of the cylindrical body member 301.

Figure 4A:
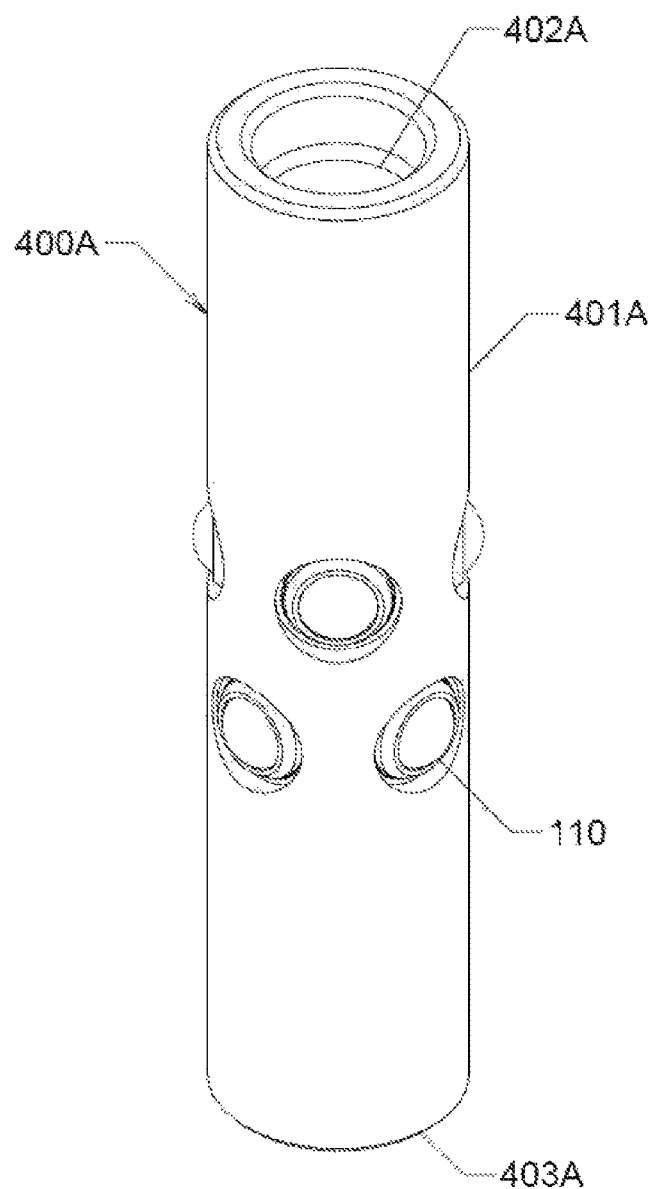
FIG. 4A illustrates a perspective view of a roller sucker rod coupling.
Figure 4B:
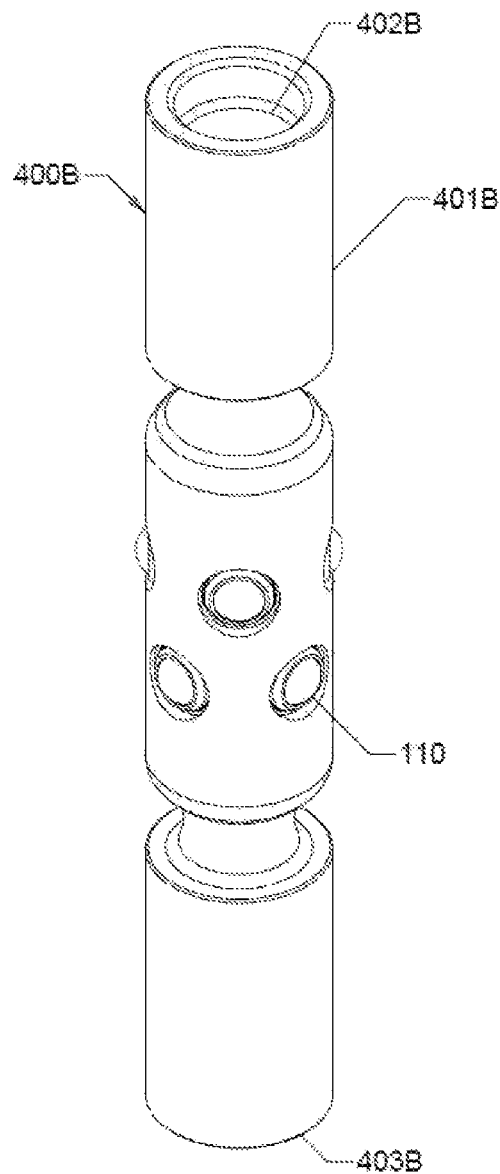
FIG. 4B illustrates a perspective view of a fishable roller sucker rod coupling.
Figure 4C:
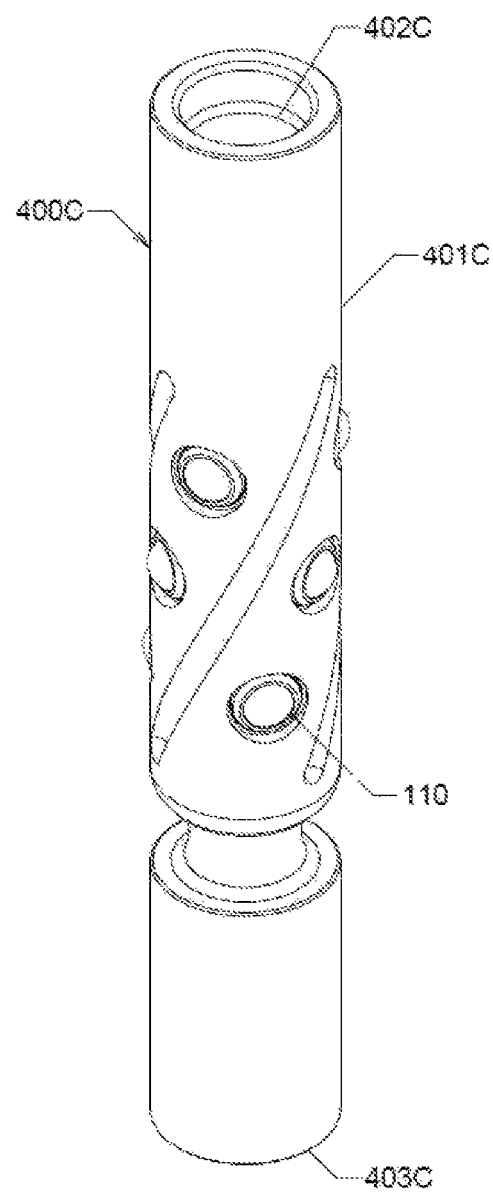
FIG. 4C illustrates a perspective view of a fishable roller sucker rod coupling with helical flow paths included.

FIGS. 4A-4B illustrate embodiments 400A, 400B, and 400C of a friction reducing tool 400 comprising a roller sucker rod coupling or jar assembly. The roller sucker rod coupling is configured to be used as a connecting tool for sucker rods used in producing a rod-lift system well. The friction reducing tools 400A, 400B, and 400C can include a housing or body member 401A, 401B, 401C having a central bore and upper and lower connectors 402A, 402B, 402C and 403A, 403B, 403C respectively. The connectors 402A, 402B, 402C and 403A, 403B, 403C which can be male and/or female, are configured for attachment to downhole equipment or tubing by one or more means, such as a, thread, weld, quick lock, cast, screw, pin and/or an O-ring seal. The friction reducing tools 400A, 400B, 400C include one or more integral friction coefficient reducers 110. The friction coefficient reducer 110 can be molded onto or machined into the cylindrical body member 401A, 401B, 401C during the manufacture of the friction reducing tool 400. A pre-determined number of friction coefficient reducers 110 can be machined into the cylindrical body member 401A, 401B, 401C. The friction coefficient reducers 110 can be arranged at pre-determined intervals along the length of the cylindrical body member 401A, 401B, 401C and can have a pronounced profile.

Figure 5A:
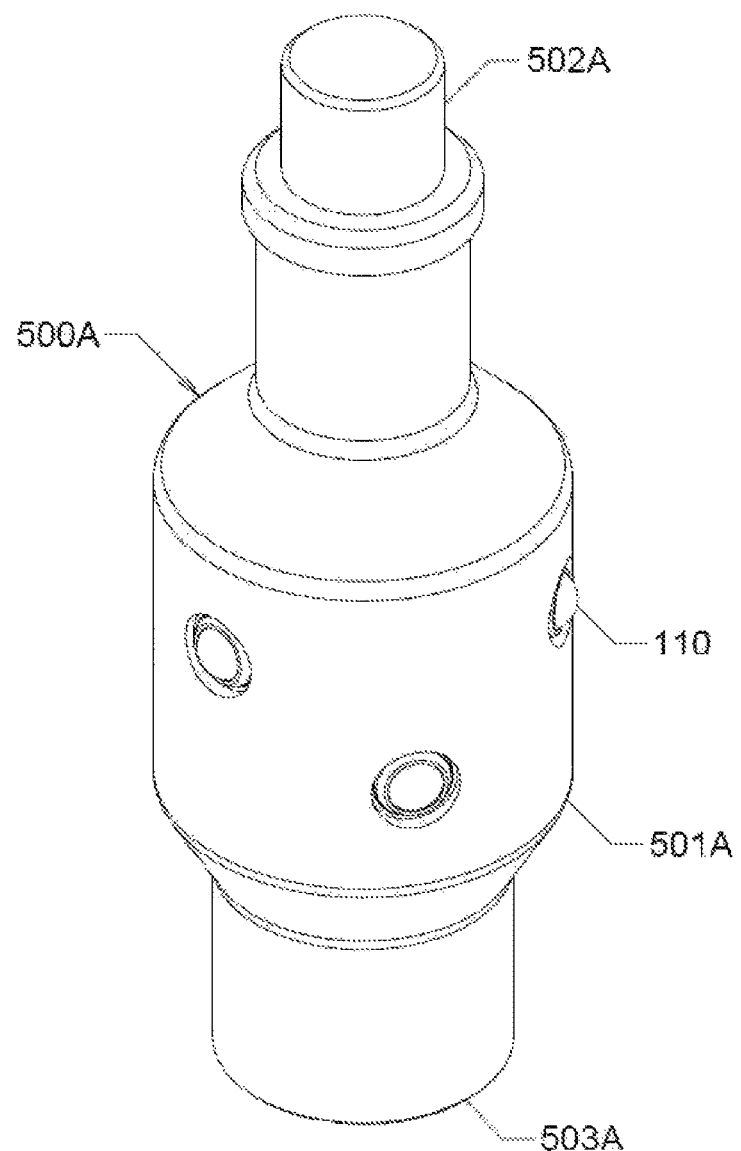
FIG. 5A illustrates a perspective view of a roller wireline sub with fishing neck.
Figure 5B:
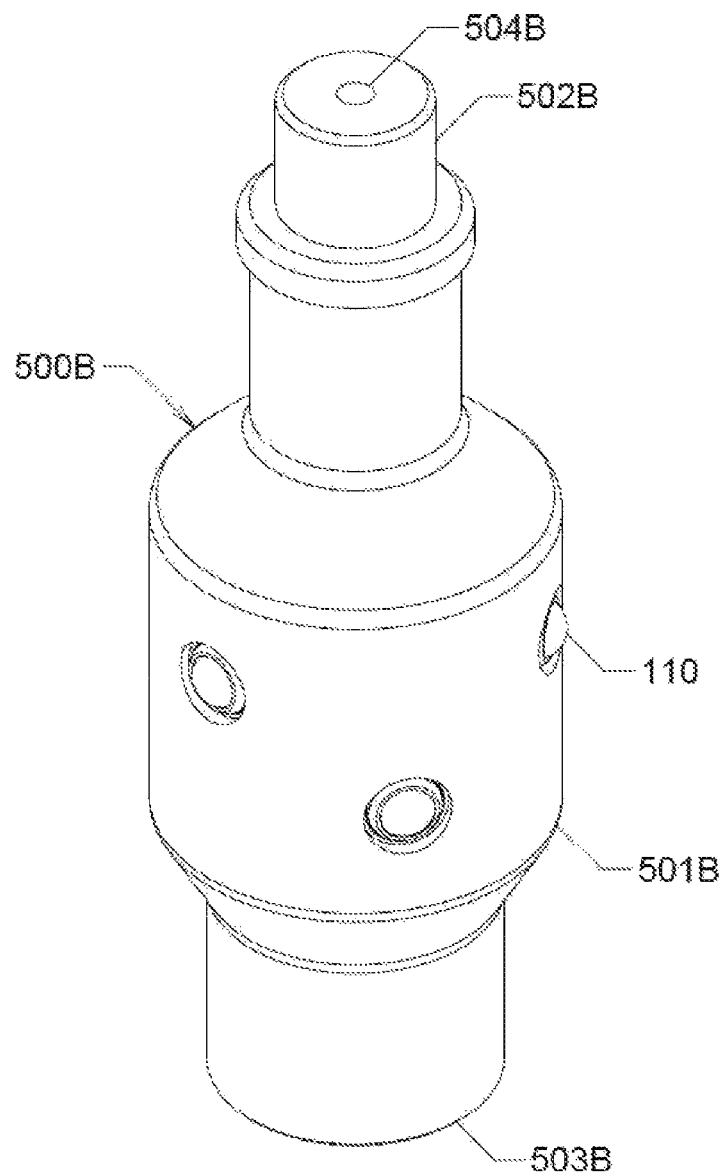
FIG. 5B illustrates a perspective view of a roller electric line sub with fishing neck.

In yet another embodiment, as illustrated in FIG. 5A-5B, a friction reducing tool 500A comprises a roller wireline stem assembly and 500B comprises a roller electric line stem assembly. The roller stem assembly 500 can replace a regular stem for operations in highly deviated wells. The friction reducing tool 500 includes a housing or body member 501A, 501B having a central bore 504B and upper and lower connectors 502A, 502B and 503A, 503B. The connectors 502A, 502B and 503A, 503B, which can be male and/or female, are configured for attachment to downhole equipment or tubing by one or more means, such as a, thread, weld, quick lock, cast, screw, pin and/or an O-ring seal. The friction reducing tool 500 includes one or more integral friction coefficient reducers 110. The friction coefficient reducer 110 can be molded onto or machined into the cylindrical body member 501 during the manufacture of the friction reducing tool 500. A pre-determined number of friction coefficient reducers 110 can be machined into the cylindrical body member 501. The friction coefficient reducers 110 can be arranged at pre-determined intervals along the length of the cylindrical body member 501. The inclusion of the friction coefficient reducers 110 facilitate a substantial reduction in friction against the tubing walls and facilitates the conveyance of downhole tools and equipment to a required depth. The friction coefficient reducers 110 can be configured to protrude from an outer surface of the body member. The roller electric stem assembly 500B also includes in the internal bore 504B a current or electric conductor (not shown). The conductor can consist of a rod, wire, or other means isolated by an insulating element either consistently throughout or at an upper or lower end of the assembly.

In yet another embodiment, the friction reducing tool comprises a roller valve rod guide assembly (not shown). The roller valve rod guide includes a sucker rod that travels axially inside the inner bore of a well. In a typical application, the sucker rod is not guided or restrained in the center of the valve guide, thereby allowed to scrape and contact the inside of the rod guide. The action of the rod scraping the inside of the guide can wear metal off of the rod and guide and in severe cases cause the rod to break. The roller valve rod guide assembly can be used to reduce friction in all directions and can reduce valve rod wear due to side load forces in a rod-lift well. It can also help to centralize the sucker-rod into the pump barrel. The friction reducing tool can help keep the rod from breaking and rubbing against the standard rod guide, which also gets damaged from the rod rubbing against it. The friction reducing tool includes a cylindrical body having a central bore. The central bore is configured to allow a sucker rod or valve to enter/exit it. The friction reducing tool further comprises an integral fishing mechanism, such as, a fishing neck at a first end. A fishing tool (not shown) can engage on a surface of the fishing neck during the retrieval of downhole equipment, including tubing and tools, that are stuck or lost in a wellbore. The fishing neck can be configured to have a specific profile to facilitate engagement and release with a lower section of a valve rod or bushing. The friction reducing tool further includes a connector located a lower end. The connector is configured for attachment to a downhole equipment or tube, which can be male or female by means of a thread, weld, quick lock, cast, screw, pin and/or and O-ring seal. The tool includes an integral friction coefficient reducer (110). The friction coefficient reducer can be molded onto or machined into the cylindrical body member during the manufacture of the friction reducing tool. A pre-determined number of friction coefficient reducers can be arranged at desired positions along the length of the body member. As shown, the friction coefficient reducer can be configured to protrude inside the body of the tool.

Although the friction coefficient reducer has been described with reference to the various embodiments of the friction reducing tool 100-500, as disclosed herein, it is understood that the friction coefficient reducer can be incorporated as part of any tool such as, a swivel, roller sub, roller tool, or roller assembly—including a roller sub mule shoe, electric-line weight bar, slickline weight bar, or roller tubular sub. The friction reducing tool can be threaded into and can be included as a roller sub within a larger pipe assembly using threaded connections, set screws, or other connection means well known to those having skill in the art. As the embodiments show, the friction reducing tool of the present invention can be an integral component of the tubular, such as casing, where its internal wall is common to the casing internal wall.

The tool can have any profile, including a cylindrical, hexagonal or other desired profile. Additionally, a wide array of friction reducing element placements and number of configurations are also contemplated within the scope of the invention. All such embodiments are included within the scope of the present invention.

The friction reduction tool can be connected to downhole equipment or tools via threading, welding, molding, pinning, caging, forging, casting, a slip prevention system, machining, adhesive, and/or other means of attachment. The friction reducing tool of the present invention can be placed anywhere in a string of tubing/pipe/coiled tubing/e-line/wireline. Multiple such friction reducing tools can be placed, as needed, along their length.

The embodiments of the invention can be used to reduce friction, drag, torque and other forces in deployment, and/or placement, and/or retrieval, and/or continuous operation of a device, tool, or another equipment or component of a deployment, retrieval, or production system. The friction reducing tool of the present invention is configured to ensure integrity of tubing, casing and components that come in contact during their deployment, retrieval, or operation. The friction coefficient reducer allows full rotation and movement in all vertical, horizontal, and diagonal directions. It allows the equipment to have the ability to rotate and roll freely along the trajectory of the well. The friction reducing tool of the present invention helps maintain integrity without pressure loss or the need to have external centralizers, which can break or create fishing problems.

The friction reducing tool of the present invention can traverse obstructions in the wellbore and substantially reduces potential damage caused by contact with downhole tools, pipe, rods, tubing, casing, or the wellbore.

While a typical surface of a normal tool or device has a friction coefficient of 0.20, the friction reduction tool of the present invention can have a substantially lower friction coefficient of 0.005 per friction coefficient reducer in the friction reducing tool of the present invention.

The friction reduction tool, while connected, can increase maneuverability during deployment, and/or retrieval, and/or operation of downhole equipment or tools. The friction reduction tool allows the trajectory in many wells to be reached that cannot be reached by standard means. Reaching the target in a timely manner also reduces rig downtime and rig costs. This greatly reduces the need to run the equipment using conventional means and can shorten the allotted time as well.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and embodiments be considered as exemplary only.

The invention claimed is:

1. A friction reducing tool for use in a wellbore, comprising:
   a tool body; and
   one or more friction coefficient reducers integral to the tool body,
   wherein the tool body is configured as a load bearing surface for the one or more friction coefficient reducers,
   each friction coefficient reducer further comprising:
      a load-bearing roller ball unit; and
      an array of supporting roller ball units, each supporting roller ball unit configured to abut at least a side of the load-bearing roller ball unit,
      wherein the supporting roller ball units are disposed in a cavity bounded by a concave surface of the tool body, a convex surface of the load-bearing roller ball unit and a bottom surface of a ball restraint,
      wherein the ball restraint is further held in position by a ball retainer, and wherein the ball retainer is selected from a group consisting of a clip, a circular clip, a snap ring and a spiral ring.

2. The friction reducing tool according to claim 1, wherein the tool body has a cylindrical profile.

3. The friction reducing tool according to claim 1, wherein the friction coefficient reducers are configured to substantially reduce frictional and axial forces and negative effects of side-load forces.

4. The friction reducing tool according to claim 1, wherein the friction coefficient reducers are configured to reduce friction in multiple planes.

5. The friction reducing tool according to claim 1, wherein the friction coefficient reducers are configured to reduce torque and/or drag.

6. The friction reducing tool according to claim 1, wherein the load-bearing roller ball unit has a substantially larger diameter than the supporting roller ball units.

7. The friction reducing tool according to claim 1, wherein the supporting roller ball units are configured to share an external force applied to the tool body and/or the load-bearing roller ball unit.

8. The friction reducing tool according to claim 1, wherein the supporting roller ball units are configured for omni-directional movement.

9. The friction reducing tool according to claim 1, wherein the supporting roller ball units are configured in a single and contiguous layer.

10. The friction reducing tool according to claim 1, wherein the ball restraint is selected from a group consisting of a cap, a ring and a washer.

11. The friction reducing tool according to claim 10, wherein the ball restraint is configured to securely hold the supporting roller ball units within the cavity.

12. The friction reducing tool according to claim 11, wherein the ball restraint is configured to restrain the load-bearing roller ball unit and to ensure that the load bearing roller ball unit is in constant contact with each of the supporting roller ball units.

13. The friction reducing tool according to claim 1, wherein the friction reducing tool is selected from a group consisting of a roller coiled tubing connector, a roller tubing sub assembly, a roller sucker coupling, a roller wireline stem assembly and a roller valve rod guide.

14. The friction reducing tool according to claim 13, wherein the tool body comprises at least one connector, and wherein the connector is located at a first and/or a second end of the tool body.

15. The friction reducing tool according to claim 14, wherein the connector is selected from a group consist of a thread, a slip prevention device, a weld, a pin, a quick lock, a clip, screws, an anchor, a ratchet, a cast, a collet, an adhesive or combinations thereof.

* * * * *